US012497819B2

(12) United States Patent
Klein et al.

(10) Patent No.: US 12,497,819 B2
(45) Date of Patent: Dec. 16, 2025

(54) AUTOMATIC SWING DOOR AND SENSOR

(71) Applicant: BEA SA, Angleur (BE)

(72) Inventors: Jean-François Klein, Eupen (BE); Sébastien van Loo, Vaux-et-Borset (BE)

(73) Assignee: BEA SA (BE)

( * ) Notice: Subject to any disclaimer, the term of this patent is extended or adjusted under 35 U.S.C. 154(b) by 214 days.

(21) Appl. No.: 18/017,880

(22) PCT Filed: Jul. 28, 2021

(86) PCT No.: PCT/EP2021/071173
§ 371 (c)(1),
(2) Date: Jan. 25, 2023

(87) PCT Pub. No.: WO2022/023427
PCT Pub. Date: Feb. 3, 2022

(65) Prior Publication Data

US 2023/0272663 A1 Aug. 31, 2023

(30) Foreign Application Priority Data

Jul. 28, 2020 (DE) .................... 10 2020 119 925.2

(51) Int. Cl.

| | |
|---|---|
| ***G05B 5/00*** | (2006.01) |
| ***E05F 15/611*** | (2015.01) |
| ***E05F 15/73*** | (2015.01) |
| ***H02H 7/08*** | (2006.01) |
| ***H02P 1/04*** | (2006.01) |

(52) U.S. Cl.
CPC ............ *E05F 15/73* (2015.01); *E05F 15/611* (2015.01); *E05Y 2400/44* (2013.01); *E05Y 2600/46* (2013.01); *E05Y 2900/132* (2013.01)

(58) Field of Classification Search
CPC ................................ E05F 15/73; E05F 15/611
USPC .......................................................... 318/480
See application file for complete search history.

(56) References Cited

U.S. PATENT DOCUMENTS 5,963,000 A 10/1999 Tsutsumi et al.
7,362,224 B2 4/2008 Zambon
(Continued)

FOREIGN PATENT DOCUMENTS

CN 1725002 A 1/2006
DE 10 2018 208 440 A1 12/2019
(Continued)

*Primary Examiner* — Erick D Glass
(74) *Attorney, Agent, or Firm* — FRIJOUF, RUST & PYLE, P.A.

(57) ABSTRACT

The invention relates to an automatic swing door (10, 100), comprising a door controller (22, 122), further comprising a door leaf arrangement (12, 112) that is pivotably attached to a door frame (30), where the door leaf arrangement (12, 112), comprises a door leaf (14, 114) that has a following face (15*b*) that is facing to the door opening (20) and a leading face (15*a*) that is facing away from the door opening (20), a hinged edge (15*d*) and a main closing edge (15*c*) that lies opposite to the hinged edge (15*d*), the door leaf arrangement (12) comprises a leading face sensor (16) that is attached to the leading face (15*a*) of the door leaf (14), where the leading face sensor (16) provides a scanning field that at least covers a zone that lies next to the leading face of the door leaf.

31 Claims, 6 Drawing Sheets

(56) References Cited

U.S. PATENT DOCUMENTS

| | | | | |
|---|---|---|---|---|
| 8,471,704 | B2 * | 6/2013 | Albers | B66B 13/26 340/545.1 |
| 10,605,001 | B2 | 3/2020 | Bartole et al. | |
| 2004/0140782 | A1 | 7/2004 | Okabe et al. | |
| 2006/0169876 | A1 | 8/2006 | Zambon | |
| 2008/0007710 | A1 | 1/2008 | Zambon | |
| 2019/0257132 | A1 | 8/2019 | Walser | |
| 2020/0183005 | A1 | 6/2020 | Van Loo et al. | |
| 2021/0011126 | A1 | 1/2021 | Radermecker | |
| 2021/0011160 | A1 | 1/2021 | Radermecker | |
| 2022/0268083 | A1 * | 8/2022 | Wegner | E05F 15/73 |
| 2023/0193685 | A1 * | 6/2023 | Hauri | E05F 15/632 49/31 |

FOREIGN PATENT DOCUMENTS

| | | | |
|---|---|---|---|
| EP | 1619342 | B1 | 1/2006 |
| EP | 1 832 866 | A2 | 9/2007 |
| EP | 3247860 | B1 | 11/2017 |
| EP | 3 575 534 | A1 | 12/2019 |
| JP | H09209652 | A | 8/1997 |
| JP | 2004044109 | | 2/2004 |
| JP | 2006038854 | | 2/2006 |
| JP | 2020516910 | A | 6/2020 |
| JP | 2020516911 | A | 6/2020 |
| JP | 2020523604 | A | 8/2020 |
| WO | WO 2016/116178 | A1 | 7/2016 |

* cited by examiner

AUTOMATIC SWING DOOR AND SENSOR

This patent application is the national phase entry, of PCT/EP2021/071173, international application filing date Jul. 28, 2021, which claims the benefit and priority of and to German patent application no. 10 2020 119 925.2, filed Jul. 28, 2020.

PCT/EP2021/071173, international application filing date Jul. 28, 2021 and German patent application no. 10 2020 119 925.2, filed Jul. 28, 2020 are incorporated herein by reference hereto in their entireties.

BACKGROUND OF THE INVENTION

The present invention relates to an automatic swing door as well as to a sensor r an automatic door.

It is known that an automatic swing door comprises a door leaf that is controlled by a door controller that opens and closes the door upon an opening signal. Furthermore, the door controller is connected to door sensors that are attached to both faces of the door leaves. During the opening of the door, the side of the door leaf facing away from the door opening is monitored by the sensor attached to it. Upon the detection of an object in the detection zone of the sensor a signal is provided for the door controller so that the door controller stops the opening movement of the door leaf. Usually, after an object has left the detection zone, the opening movement is resumed. The door leaf closes after a certain timespan, if the opening is no longer requested. According to this measure a person getting in the way of the door leaf during the opening movement can be protected from being hit by the door leaf. During closing of the door leaf, the side of the door leaf facing the door opening is monitored by the sensor attached on the side of the door leaf facing the door opening. Upon detection during the closing movement of the door, the door leaf is reopened. Therefor a detection signal is provided from the sensor to the door controller so that the closing movement is reversed into a reopening movement. This behavior will allow people to still pass already closing doors without being hit by the door leaf. For such applications e.g. BEA's LZR®-Flatscan SW is used.

Although all these safety measures can be in place, it still can happen at the main closing edge of the door leaf, which is the edge opposite to the hinges of the door, that e.g. fingers can be pinched by the closing door leaf between the door frame and the door leaf or between two door leaves of an automatic swing door.

SUMMARY OF THE INVENTION

It is an object of the invention to improve the safety of automatic swing doors on their main closing edge in order to avoid pinching or crushing of objects, especially fingers, on the main closing edge of the door leaf.

The problem is solved by the characterizing feature of claim 1 in combination with the features of the preamble of claim 1.

Further advantageous embodiments of the invention are described in the dependent claims.

In a known way, an automatic swing door comprises a door controller, further comprising a door leaf arrangement that comprises a door leaf that is pivotably attached to a door frame on one lateral side of the door leaf to cover a door opening. The door controller usually can control at least one door leaf to open, close, reopen and stop in its movement.

Furthermore, the door leaf has a following face that is facing to the door opening and a leading face that is facing away from the door opening. The door leaf furthermore comprises a hinged edge and a main closing edge opposite to the hinged edge. The door leaf arrangement comprises a leading face sensor that is attached at the leading face of the door leaf.

The leading face sensor is preferably attached, close to the hinges, as seen in a lateral direction. The leading face sensor provides a scanning field, where the scanning field extends along the door leaf in direction of the main closing edge of the door leaf which is opposite to the hinged edge. At least one detection zone is defined within the scanning field. The detection zone is the part of interest of a potentially indefinite scanning field. The detection zone comprises a detection area that is a ground projection of the detection zone. Accordingly, the detection zone basically covers the volume above the detection area. The detection zone is preferably close to the door leaf, or even, as close as possible to the door leaf.

Within this detection zone a leaf zone is defined extending over the main part, especially more than 70%, of the width of the door leaf.

Above this, the sensor comprises a movement determination unit, to determine the angular movement and or the angular position of the door.

It is known that the knowledge of the angular position of the door can be used to restrict the detection zone of the scanning field or to reduce the detection zone to avoid false detection and self-activation.

According to the invention, an edge zone of the detection zone is defined within the detection zone of the leading face sensor. The edge zone extends beyond the leaf zone in direction of the main closing edge. Preferably, the edge zone extends beyond the door leaf. The automatic swing door is preferably configured in a way that during the closing movement of the door, a detection of an object within this edge zone triggers the door controller to reopen the door leaf or to open the door. The automatic swing door is furthermore configured in a way that during the opening movement the movement of the door leaf is stopped upon a detection of an object within the leaf zone. Preferably, the automatic swing door can be additionally configured in a way that the automatic swing door does not open, if an object is detected within the leaf zone.

This allows the detection of an object approaching the leading face of the door leaf to be detected and therefore, the pinching of a person or parts of it, e.g. between the door leaf and the door frame at the main closing edge, can be prevented.

The edge zone is preferably monitored only during a predefined angular range of the closing movement of the door leaf. The range is preferably between 45' opening angle and full closure of the door leaf.

Particularly, during the closing operation of the door leaf, a defection of an object in the leaf zone of the leading face sensor does not have any impact on the behavior of the door. This can exemplarily be because the door controller ignores a submitted stop signal or because the sensor ignores a detection event in the leaf zone during closing.

As the monitored edge zone only contains an outer part of the detection zone, and as the angular range can be adjusted in a way that the monitoring starts at a partially closed angular position, from e.g. a half closed position and continues to a closed position, only situations are covered that are potentially dangerous. Accordingly, an interruption free operation of the door can largely be maintained although the safety is increased.

The edge zone can be adapted in shape depending on the position of the door, especially at a position that is close to the fully closed door position. This e.g. can prevent false detection information by seeing the door frame. This prevents a false triggering of the reopen signal.

According to a further embodiment of the invention, the door leaf arrangement can comprise a following face sensor that is attached on the following face of the door leaf.

The following face sensor comprises a leaf zone and also preferably comprises a subsequent edge zone close to the main closing edge of the door. According to a standard setup the door controller will reopen upon a detection of an object in the leaf zone as well as in the edge zone during the closing operation. Preferably, the automatic door can be additionally configured in a way that the door does not close, if there is detection of an object within the leaf zone.

The monitoring of the edge zone can preferably be shut off or the reopen signal is ignored by the door controller in a closed position of the door leaf so that an approach of the door in that state may not falsely trigger a reopening of the door leaf. The monitoring of the edge zone can be shut off instantly when the door is fully closed or after a certain timespan after the door is closed.

The leading face sensor or the following face sensor may determine that the door leaf is in a closed position by receiving the information from the door controller.

The door leafs angular position f motion can also be determined by a motion and/or position detector, especially a gyroscope. The movement determination unit in this case comprises a motion and/or position detector, especially a gyroscope. This has the advantage that the sensor has intrinsic information of the door leaf position without the need to communicate with external resources.

The leading face sensor and the following face sensor comprise a door controller interface to communicate actions to the door controller. The door controller interface preferably is able to communicate three different actions to the door controller. The actions especially are open, reopen, and stop. The leading face sensor and the following face sensor can be connected to the door controller in a parallel way.

According to a further advantageous embodiment of the invention, the following face sensor and the leading face sensor are connected via a communication bus, where only the following face or the leading face sensor is connected to the door controller via its door controller interface and communicates the respective signals to the door controller.

The communication between the leading face sensor and the following face sensor allows the redundant use of components like the motion and or position detector. Accordingly, the signals received by the motion and or position detector can be verified.

The door controller interface of the leading face sensor and/or the following face sensor can comprise three output ports that are connected to the corresponding input ports of the door controller, preferably via discrete wiring. Each output port is used to communicate a specific command to the door controller. The output port can comprise a relay so that the specific function on the door controller is triggered by switching a relay.

The following face sensor and leading face sensor are preferably linked via a master/slave architecture, where the sensor being the master is preferably connected to the door controller.

This setup allows a single wiring from one sensor to the door controller only and no parallel wiring of both sensors is needed to enable the door controller to provide all necessary functions. In case of a master/slave architecture at least one of the sensors must be equipped accordingly to communicate all necessary information to the door controller. In case of a standard door controller the output ports being electronic relays are connected to the door controller to communicate the “stop”, “open” and “reopen” signal to the door controller.

Due to a further improvement of the invention, the sensor comprises a scanning unit that comprises a laser scanner that functions based in the Time of Flight principle. Preferably, the laser scanner is a scanner comprising a rotating mirror comprising a plurality of facets that deflect the outgoing and the reflected light pulses. Such a scanner scans along at least one scanning curtain per facet sweep. Preferably, the facets are tilted against one another relative to the rotation axis so that the scanner scans a plurality of tilted curtains. As a result to such a setup, the detection area has a certain depth in the direction perpendicular to the door leaf. This setup avows the scanning of a three dimensional detection zone.

The depth of the detection zone allows to further extend the edge zone beyond the main closing edge without interfering with a door handle that might cause a shadowing effect on a single curtain. Shadowing prevents the scanner from seeing an object next to the main closing edge of the door leaf.

According to a further aspect of the invention the shape of the edge zone is an essentially curved one. This curved shape allows to maximize the edge zone area in a static way. Otherwise the shape of the edge zone area would permanently have to be adjusted to prevent disturbance e.g. by a wall.

A further aspect of the invention refers to an automatic swing door having a door leaf arrangement as previously described and having a second door leaf arrangement comprising a following face and a leading face sensor where these sensors are attached to the door leaf in the way as previously described.

The second door leaf arrangement and the first door leaf arrangement are preferably operated in an asynchronous way, where the first door leaf trails the second door leaf during closing movement. In this case the second door leaf is in a closed position before the first door leaf.

In case of a synchronous operation of the first door leaf arrangement and the second door leaf arrangement, both are embodied analogously to the single door leaf arrangement previously described.

In a synchronous operation both door leaf arrangements are closing symmetrically. In this case, the first door leaf and the second door leaf are in a closed position at the same time.

In difference to the first door leaf arrangement the second door leaf arrangement has different edge zone definitions for its following face sensor and leading face sensor. In a closed state of the second door leaf, a detection of an object in the edge zone leads to an opening of the door.

For this reason, the following face and the leading face sensor preferably comprise a first output port for triggering the reopen function, a second output port for triggering the stop function and a third output port for triggering the open function to open a door.

The sensor may have a door status determination unit. The door status determination unit can positively create a “door is open” signal, e.g. as long as the other door is not closed, and or positively a “door is closed” signal, once the door is fully closed. The automatic swing door is considered fully closed when both door leaves are closed.

The door status determination unit can comprise a connection to the door controller. Due to this connection it can determine the status of the door by evaluating the position or the status of the door leaves that are communicated by the door controller and knows when both door leaves are closed.

The positive "door is open" signal can alternatively be generated by extending the detection zone beyond the edge zone in direction of the other door leaf. This additional zone may extend about the width of the door leaf. E.g. as long as a specific change of detection events occurs in this zone the door is assumed to be open.

Preferably, the edge zone of the leading face sensors and or the following face sensor attached to the second door leaf are activated, once the door status determination unit provides a "door is open" signal or stops to provide a "door is closed" signal, e.g. on opening of the first door leaf.

In the case that a timer is used to shut off the edge zone after the door leaf is closed, the timer can be reset as long as such a positive "door is open" signal is determined by the door status determination unit.

During closing, the leaf zone that lies laterally beside the edge zone on the leading face sensor can be set to provide a stop signal or can be deactivated. During opening, the leaf zone can be configured to trigger a stop signal on the door controller. Preferably, the automatic door additionally can be configured in a way that the door does not open if there is detection of an object within the leaf zone. During opening, the edge zone of the leading face sensor can be deactivated.

A delayed shut off of the monitoring of the edge zone is useful, when the automatic swing door comprises two door leaf arrangements. In case of a delayed shut off, the automatic swing door can be configured in a way that a detection event within the edge zone of the following face sensor of the second door leaf and/or the leading face sensor leads to an opening signal, where at least the door leaf to which the following face sensor and the leading face sensor are attached to, opens from a closed position.

The delayed shut off can be achieved by starting a timer when the first door leaf to close is in a closed position.

In a closed position of the door leaf the following face sensor and f or the leading face sensor can provide an opening signal, upon detection in the edge zone.

During closing of the door, the following face sensor is preferably embodied to provide a reopening signal upon a detection of an object within the leaf zone that can overlap the edge zone. In a closed position the following face sensor can provide an opening signal upon detection in the edge zone, where the leaf zone is inactive during the closed position and or the signal provided by the sensor in this case can be ignored by the door controller.

The following face sensor facing the door opening comprises an edge zone within its detection zone that extends beyond the door leaf, especially beyond the main closing edge of the door leaf. This edge zone is activated until the first door leaf is in a closed position. Upon detection of an object within this edge zone during closing, the door leaf is reopened. In a closed position the whole door is opened again.

According to a further aspect of the invention the shape of the edge zone is an essentially curved one. This curved shape allows the maximization of the edge zone in a static way. Otherwise the shape of the edge zone would permanently have to be adjusted to prevent disturbance by the other door leaf.

Preferably, there is a relation in movement between the two door leaves, where the relation can be realized by a connection between the two door controllers. According to such a relation both door leaf arrangements can be opened at the same time upon a detection of an object only by one door leaf arrangement.

According to a further aspect, the invention relates to a sensor producing a scanning field where a detection zone having a certain width can be monitored. The sensor comprises a door controller interface that is connectable to an input port of a door controller.

The sensor comprises a scanning unit that comprises a laser scanner that sends light pulses that are reflected by objects in the scanning field. The sensor furthermore comprises a detection evaluation unit that evaluates the received pulses according to the Time of Flight principle. The laser scanner comprises a rotating mirror to deflect the emitted pulses that has at least two facets, namely a first facet having a first inclination producing a first curtain and a second facet having a second inclination producing a second curtain. The basic operation principle of such laser scanners is regarded as known to a person skilled in the art as for example disclosed in EP 1 832 866 A2.

The facets are inclined differently with regard to the rotational axis of the mirror. The light pulses are deflected at the mirror facets, where the emitted pulses along one mirror facet produce a curtain over a facet sweep. A facet sweep is a series of pulses sent to the same facet during the rotation of the mirror by a facet rotation angle. The facet rotation angle lies between an angular start position where the pulses can be fully deflected for the earliest time on the facet to contribute to establish the scanning field and an angular end position where the pulses can be fully deflected for the latest time on the facet.

The predefined facet rotation angle is dependent on the number of facets of the mirror.

It is an object of the invention to provide a safety sensor having multiple curtains, where the sensor should provide a fast response time and a high resolution. The sensor should be relatively small so that it can be easily mounted on swing door leaves.

According to the invention, the detection determination unit is embodied to execute a first evaluation step, where a first set of measurements of pulses is evaluated. The first set of measurement contains at least some measurements of the pulses that are accumulated over at least two facet sweeps where the pulse emission is triggered in a way that a plurality of pulses are shifted with regard to the angular mirror position in a way that they have shifted deflection angles, in subsequent facet sweeps. The first set of measurements defines a "high resolution" part in the detection zone.

Based on the first set of measurements, the determination unit is embodied to determine, whether or not an object is present in the high resolution part of the detection zone. The high resolution zone particularly is more or less a virtual curtain in which physical curtains with the same facet angle are superposed. According to this, small objects for example fingers can be detected within this high resolution zone.

The detection determination unit is furthermore embodied to execute a second evaluation step, where a second set of measurements is evaluated and where the second set of measurements contains measurements of only one facet, sweep of the second facet.

Based on the second set of measurements, the determination unit determines whether or not an object is present in the detection zone of the second curtain. This allows a fast reaction time of the sensor after one facet sweep only so that a safety action can be taken as quickly as possible with respect to the speed of rotation of the mirror.

According to this solution no additional pulses are required to increase the resolution within a certain zone and, therefore, no additional measures with regard to heat dissipation are required and the overall size of the sensor can be kept rather small.

The plurality of pulses preferably consists of the majority of pulses of the second facet sweep.

Preferably, the first set of measurements contains all measurements of the subsequent facet sweeps. This will result in an evaluation having a higher resolution over the entire virtual first curtain.

According to a further aspect of the invention, the first set of measurements is obtained in a way that the results of the pulses deflected by the first facet are accumulated over at least two subsequent facet sweeps of the first facet. Due to this embodiment of the device, the number of differently inclined facets can be increased at a small size of the mirror, as only one facet per curtain is necessary.

According to a further embodiment, the mirror can comprise a third facet where the third facet comprises essentially the same inclination as the first facet. The first set of measurement can be obtained by accumulating the measurements over the first facet sweep and the third facet sweep. This allows a higher resolution at a quick response time of the sensor.

In an advantageous way, the first and the second curtain are tilted in respect to the vertical plane in a mounting position. The first curtain is tilted in a smaller angle than the second curtain. Particularly, the inclination of the first facet relative to the rotation axis of the mirror is smaller than the inclination of the second facet.

According to this setup the closest first curtain to the door is evaluated based on the first set of measurements, whereas the next second curtain away from the door is not. In this case a person must pass the second curtain with a quick response time before reaching the first curtain with a high resolution. According to this setup a high over all safety is provided.

According to a further embodiment of the invention, the number of pulses in the first curtain can be higher than the number of pulses in the second curtain. This will keep the number of over-all pulses per rotation low to provide low heat impact and allows an easier technical realisation.

The mirror may advantageously have a third and a fourth facet that increase in tilt angle relative to the rotational axis with regard to the first and the second facet, where preferably the third and the fourth face of the mirror create curtains with a decreasing resolution in the direction away from the door lower than the second curtain. This allows a better immunity to environmental conditions within the detection zone having a certain depth.

The sensor, furthermore, comprises a movement determination unit that determines the angular position and the angular moving direction. This allows a coordination of the detection result with regard to the sensor position that is relevant for the usage of the sensor on swing doors. The movement determination unit preferably comprises a motion and/or position detector.

The sensor, according to a further advantageous embodiment, comprises a detection determination unit that defines a detection zone within the scanning field, where a detection of an object within the detection zone can lead to a certain output at the output port. The monitored detection zone in width direction comprises at least two different subsequent zones of detection, where the separate ports are activated, depending on the detection in a certain zone and the angular position of the door and the moving direction of the door.

The detection zone is divided into at least two zones, where in width direction there is a first zone—leaf zone—and a subsequent second zone—edge zone.

According to a further improvement of the invention, the first curtain monitors the second zone—edge zone—and the second curtain monitors the first zone—leaf zone. According to this embodiment subsequent lateral zones can be monitored with different resolutions. By monitoring the leaf zone and an edge zone of a swing door as described previously, the immunity in the leaf zone is higher than it is in the edge zone. This allows detection of small objects in the edge zone and avoids false disturbances in the larger leaf zone.

The detection determination unit determines which output information is supposed to be trans the door controller and sends an according command to the door controller interface.

Preferably, the detection determination unit has a first configuration setup that sets the first output information active on a detection event inside the edge zone, when the position evaluation unit determines a moving direction in closing direction. The second output information is set to active on a detection event inside the leaf zone, when position evaluation unit determines a moving direction of the door leaf in opening direction. Additionally, the stop signal can be provided while the door is completely closed. The output information is forwarded by the door controller accordingly, The detection determination unit has a second configuration setup that sets the third output information (open) active upon a detection event within the edge zone, when the movement determination unit determines there is no movement and the position is a closed position. Additionally, the stop signal can be provided while the door is completely closed upon a detection event in the leaf zone. During closing the first output information is set to active upon a detection event in the edge zone. Additionally, the third output information can be activated in this case. The second output information is set to active on a detection event inside the leaf zone, when the position evaluation unit determines a moving direction in opening direction. Additionally, the second output information can be triggered while the door is cornpletely closed upon a detection event in the leaf zone. That prevents the door leaf from opening.

The detection determination unit has a third configuration setup that sets the first output information active upon a detection inside the edge zone or inside the leaf zone, when the position evaluation unit determines a moving direction in closing direction. Preferably, a first output information can be set active to provide a reopen signal upon detection event in the leaf zone when the position evaluation unit will determine that the door is fully open.

The detection determination unit has a fourth configuration setup that sets the third output information (open) active upon a detection inside the edge zone, when the position evaluation unit determines that there is no movement and the position is a closed position, and that sets the first output information active upon a detection inside the edge zone or inside the leaf zone, when the position evaluation unit determines a moving direction of the sensor in closing direction. Additionally, the third output information can be activated in this case. Preferably a reopen signal is provided upon detection event in the leaf zone when the position evaluation unit will determine that the door is fully open.

According to a further improvement of the invention, the door controller interface comprises three discrete output ports that can be connected by a discrete wiring to a standard door controller, where the first, second and third output information is provided by activating the first, second and third output ports. Such output ports are generally embodied as switches, preferably as electronic relays. This allows the connection of the sensor to standard swing door controllers.

According to a further embodiment of the invention, the second and the third configuration can additionally provide a deactivation of the edge zone after a timer lapses. Particularly, the timer to keep the edge zone active is started after the sensor receives the "door leaf is closed" position signal. Preferably, the configuration is set to activating the edge zone of the leading face sensors and/or the following face sensor attached to the second door leaf, once the door status determination unit provides a "door is open" signal or stops to provide a "door is closed" signal, e.g. on opening of the first door leaf.

The timer can be reset as the door determination unit provides a "door is open" signal or as long as it does not receive a "door is closed" signal.

Preferably in the closed position the detection zone can be extended to detect whether the other door leaf is moving to allow a door status determination. With this, as long as such a signal is detected, the timer can be reset or it can be used to activate the edge zone.

With four of such described sensors it is easily possible to equip a two leaved automatic swing door that reduces the danger of getting crushed between the two leaves of the automatic swing door. Further advantages, features and potential applications of the present invention may be gathered from the description which follows, in conjunction with the embodiments illustrated in the drawings.

According to a further advantageous embodiment, the invention comprises a detection determination unit that is set to execute a detection event upon detection of an object in the leaf zone staffing from a leaf zone size and in the edge zone starting from an edge zone size. The edge zone size is preferably smaller than the leaf zone size.

According to this feature, the sensitivity within the leaf zone is lower than the sensitivity in the edge zone.

As a consequence in the edge zone very small objects as for example fingers can be recognized, where the leaf zone is immune to such small objects and, therefore, less subjected to disturbances during the main part of the regular operation.

The sensor is embodied as a laser scanner that comprises a rotating mirror with a plurality of, especially four, facets inclined relative to each other to provide four scanning curtains as a scanning pulse is deflected by the mirror facets. The resulting scanning field is a three dimensional scanning field, where as a consequence the detection zone accordingly has a depth perpendicular to the door leaf.

With this setup a high physical detection resolution can be achieved where still a high level of immunity is provided. A further advantage with regard to monitoring the main closing edge of the door leaf is that the plurality of curtains can overcome the difficulties of door handles stretching along the door leaf in a vertical direction, as a door handle cannot block all curtains.

Throughout the description, the claims and the drawings, those terms and associated reference signs will be used as are notable from the enclosed list of reference signs.

BRIEF DESCRIPTION OF THE DRAWINGS

In the drawings is shown

DESCRIPTION OF THE INVENTION

Figure 1:
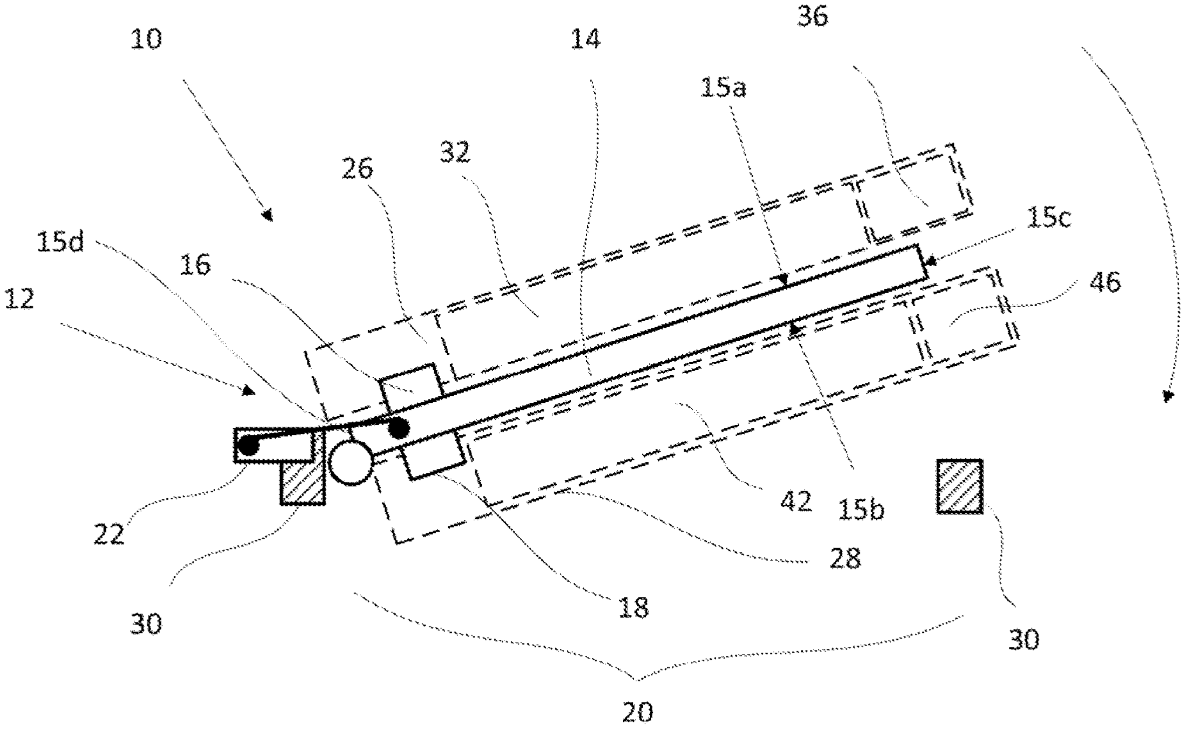
FIG. 1 a schematic top view of an automatic swing door according to the invention.

FIG. 1 shows a schematic top view of an automatic swing door 10 according to the invention. The swing door comprises a door leaf arrangement 12 having a door leaf 14 and a leading face sensor 16 mounted on the leading face 15*a* of the door facing away from the door opening 20. The automatic door 10 comprises a door controller 22 to open and close the door.

Furthermore, the door leaf arrangement 12 has a following face sensor 18 mounted on the following face of the door leaf 14. The leading face sensor 16 and the following face sensor 18 are mounted close to the hinged end 15*d* of the door leaf at the upper end of the door leaf 14 and provide a scanning field that is directed downwards and extends along the door leaf 14 in direction of the main closing edge 15*c* of the door leaf 14. Accordingly, the detection area 26, 28 extends substantially along the door leaf and has a certain depth perpendicular to the door leaf 14. The detection area 26 of the leading face sensor 16 comprises a leaf zone 32 and an edge zone 36. The leaf zone 32 covers most of the width of the door leaf 12 where the edge zone 36 covers a zone of the detection area 26 beyond the leaf zone 32 in direction of the main closing edge 15*c* and beyond the main closing edge 15*c*. The detection zone of the following face sensor 18 comprises a leaf zone 42 and an edge zone 46.

The leading face sensor 16 and the following face sensor 18 are connected to each other by a BUS communication preferably using a master slave architecture. The leading face sensor 16 is connected to the door controller 22 via a discrete wiring.

The edge zones 36, 46 are active during the closing operation as shown in FIG. 1. A detection event within the edge zone 36, 46 will lead to a reopen signal on the door controller.

The leading face sensor 16 and the following face sensor 18 comprise a movement determination unit in form of a gyroscope to know about the position of the door and the moving direction of the door. Accordingly, the edge zone 36 is activated only in the last part of the closing movement as not to negatively influence the general behavior of the door. Also the edge zone 46 of the following face sensor 18 is activated at this position. In this case, the action triggered as a result of a detection event in the edge zone does not differ from the action triggered by a detection event in the leaf zone 42. In difference thereto, a detection event in the leaf zone 32 during closing operation will not result in an action of the door 10, where a detection event in the edge zone 36 leads to reopening the door.

The leading face sensor 16 comprises output ports that each are connected to the corresponding input ports of the door controller.

Figure 2:
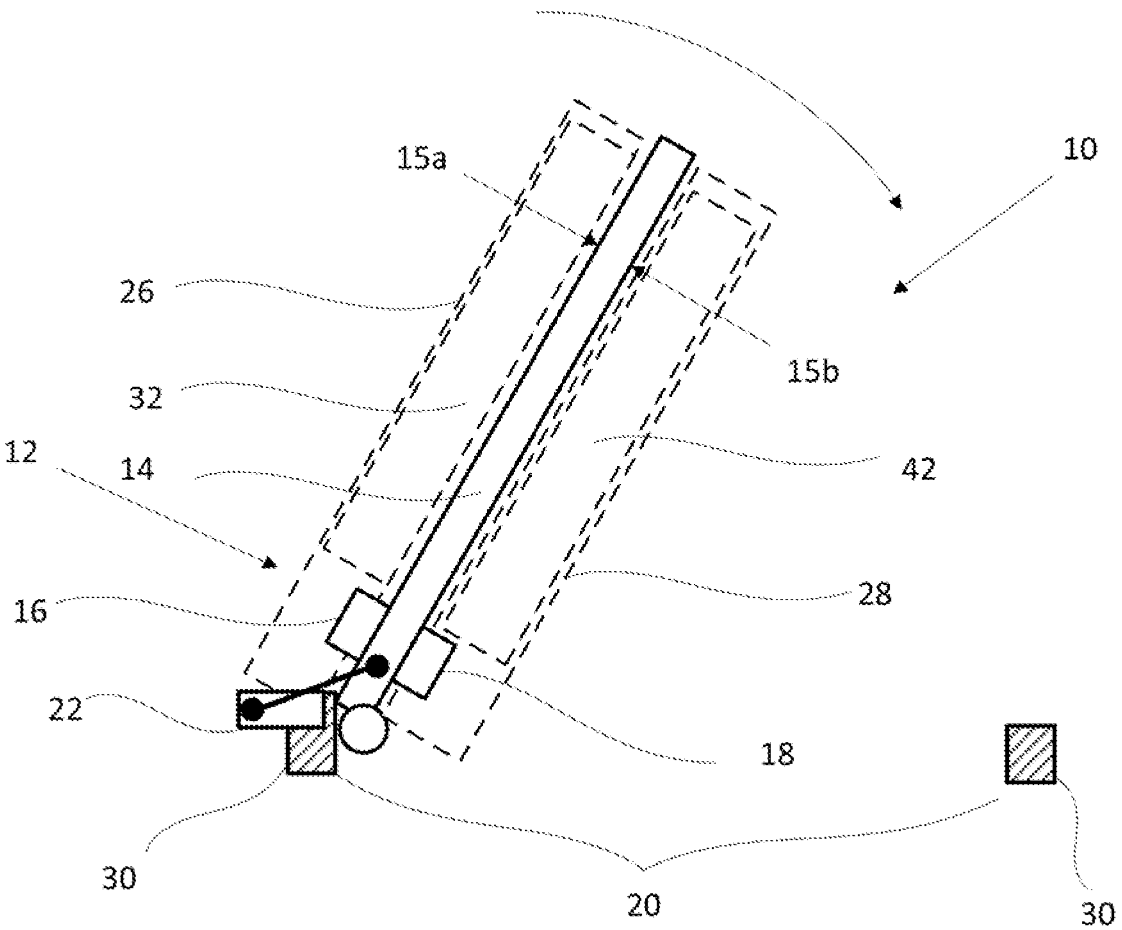
FIG. 2 a schematic top view of an automatic swing door during a closing movement previous to the position shown in FIG. 1.

FIG. 2 shows the door during a closing movement previous to the position shown in FIG. 1. Neither the leading face sensor 16 nor the following face sensor 18 monitor their edge zone in this situation, as there is no danger of getting crushed between the door frame 30 and the door leaf 14. Accordingly, a person standing beside the door leaf 14 is assumed to be safe and no safety action is required by the door controller 22.

Figure 3:
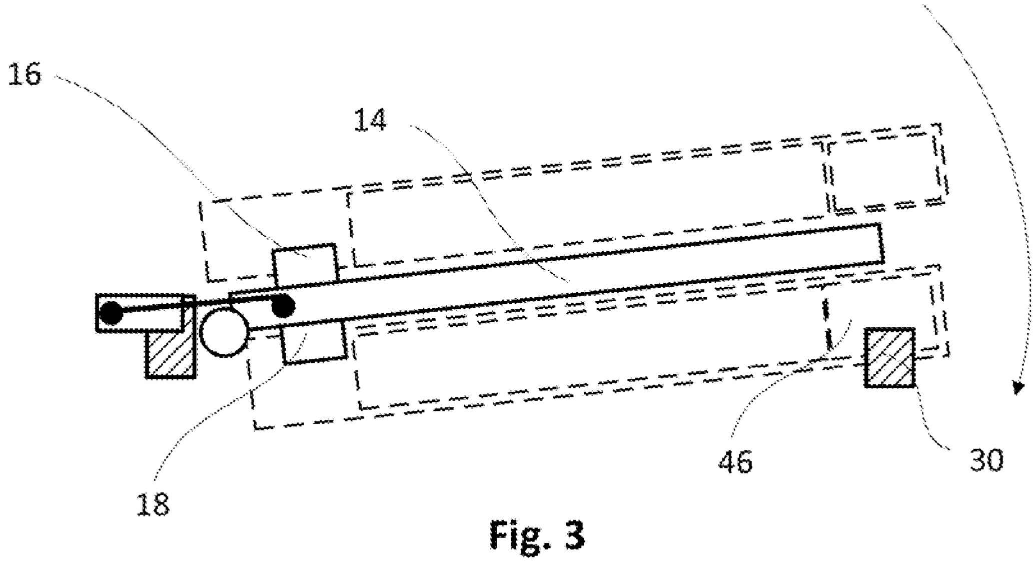
FIG. 3 a schematic top view of an automatic swing door in a door position during a closing movement subsequent to the position shown in FIG. 1.

FIG. 3 shows the door position during a closing movement subsequent to the position shown in FIG. 1. As the door leaf 14 passes by the door frame 30 the edge zone 46 and maybe also the leaf zone 42 is adapted in a way that the door frame 30 does not lie within the detection zone and, therefore, does not trigger an action during the closing of the door. This is achieved as the frame is detected within a teach in process and is ignored during operation so that the frame is no longer part of the detection zone. Once the closed position is reached by the door leaf 14 neither the stop nor the reopen actions will be executed by the door controller in a closed position.

During the opening movement that is not shown in the figures, the edge zone 46 is neither monitored by the leading face sensor 16 nor by the following face sensor 18.

Figure 4:
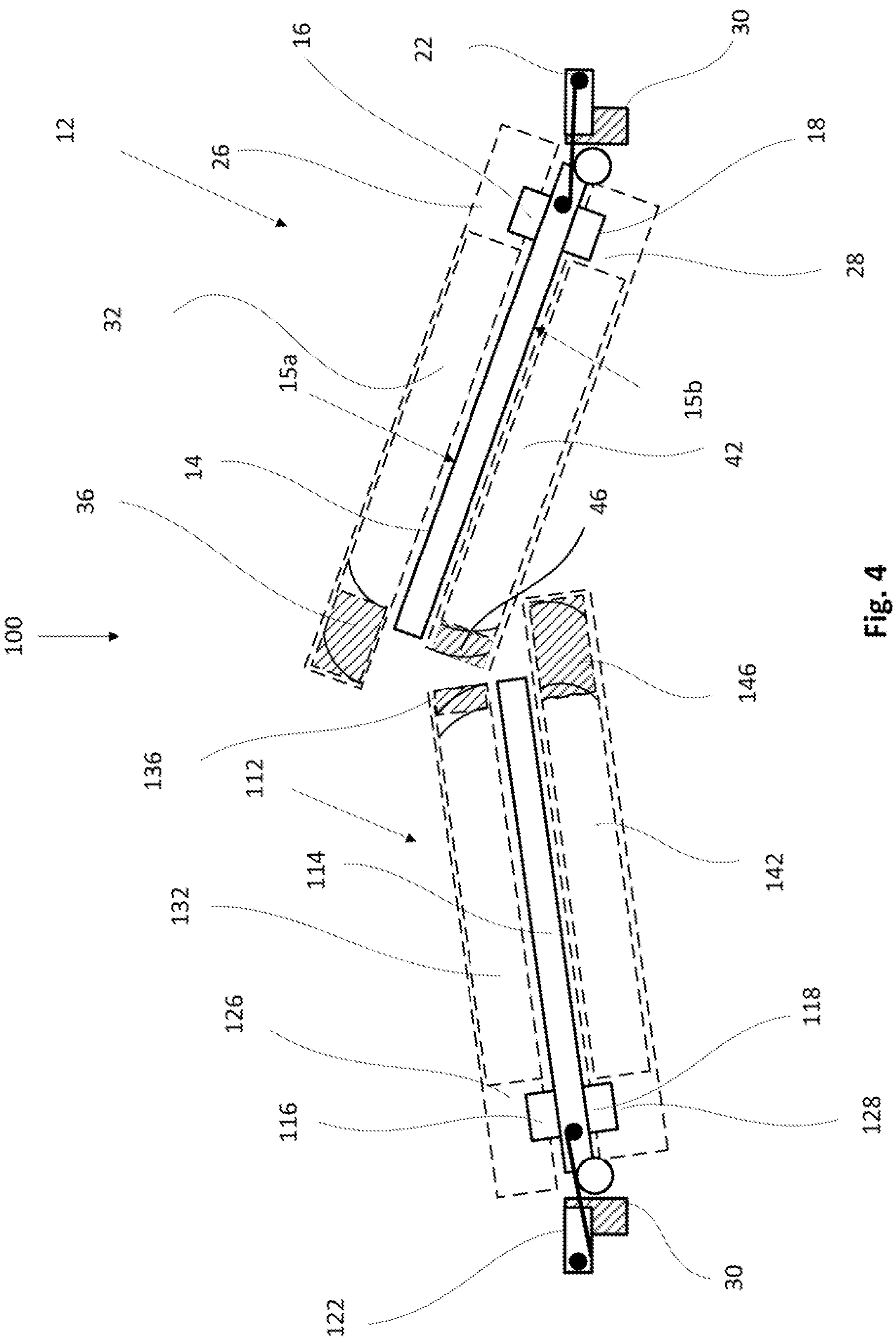
FIG. 4 a schematic top view of an automatic door according to the invention having a first door leaf arrangement and a second door leaf arrangement.

FIG. 4 shows an automatic door 100 according to the invention having a first door leaf arrangement 12 that is basically set up the same way as described with regard to the previous figures. According to FIG. 4 the door is shown during a closing operation in an almost closed position.

Additionally, to the example shown in FIG. 1 the door 100 comprises a second door leaf arrangement 112. The second door leaf arrangement 112 comprises a door leaf 114 whereto a leading face sensor 116 and a following face sensor 118 is attached and a door controller 122 that operates the door leaf 114. The two door leaf arrangements 14, 114 are operated, asynchronously in a way that for opening, the first door leaf 14 is opened before the second door leaf 114, and for closing the second door leaf 114 is closed before the first door leaf 14.

The leading face sensor 116 comprises a detection zone 126 which comprises a leaf zone 132. The leaf zone 132 provides a stop signal during an opening operation of the door. During closing of the door the stop signal is ignored by the door controller 122. During the closing of the door an edge zone 136 is present in the detection zone that lies subsequent to the leaf zone 132 in direction of the main closing edge of the door leaf 114. During closing operation a detection event in this edge zone will lead to a reopening of the door leaf. Alternatively it may also lead to a reopening of the door which means that both door leaves open.

Furthermore, the interface needs to enable a communication to activate the stop function and the reopen function of the door controller during closing. Accordingly, the sensor connected to the door controller comprises a door controller interface to communicate three different actions to the door controller 122.

The following face sensor 118 comprises a detection zone 128 having a leaf zone 142. A detection event in the leaf zone 142 during closing leads to a reopening of the door leaf 114 or both door leaves 14, 114. Above this the detection zone 128 comprises an edge zone 146 that lies subsequent to the leaf zone 142 and extends beyond the door leaf 114. A detection event in the edge zone 146 during closing leads to a reopening of the door leaf 114 or both door leaves 14, 114.

Once the door leaf 114 is closed, the reopening function is no longer executed by the door controller 122. In the closed position a detection event in the edge zone 136, 146 leads to an opening of the door 100.

FIG. 4 additionally shows the curved shapes of the specific zones that can be applied alternatively.

Figure 5:
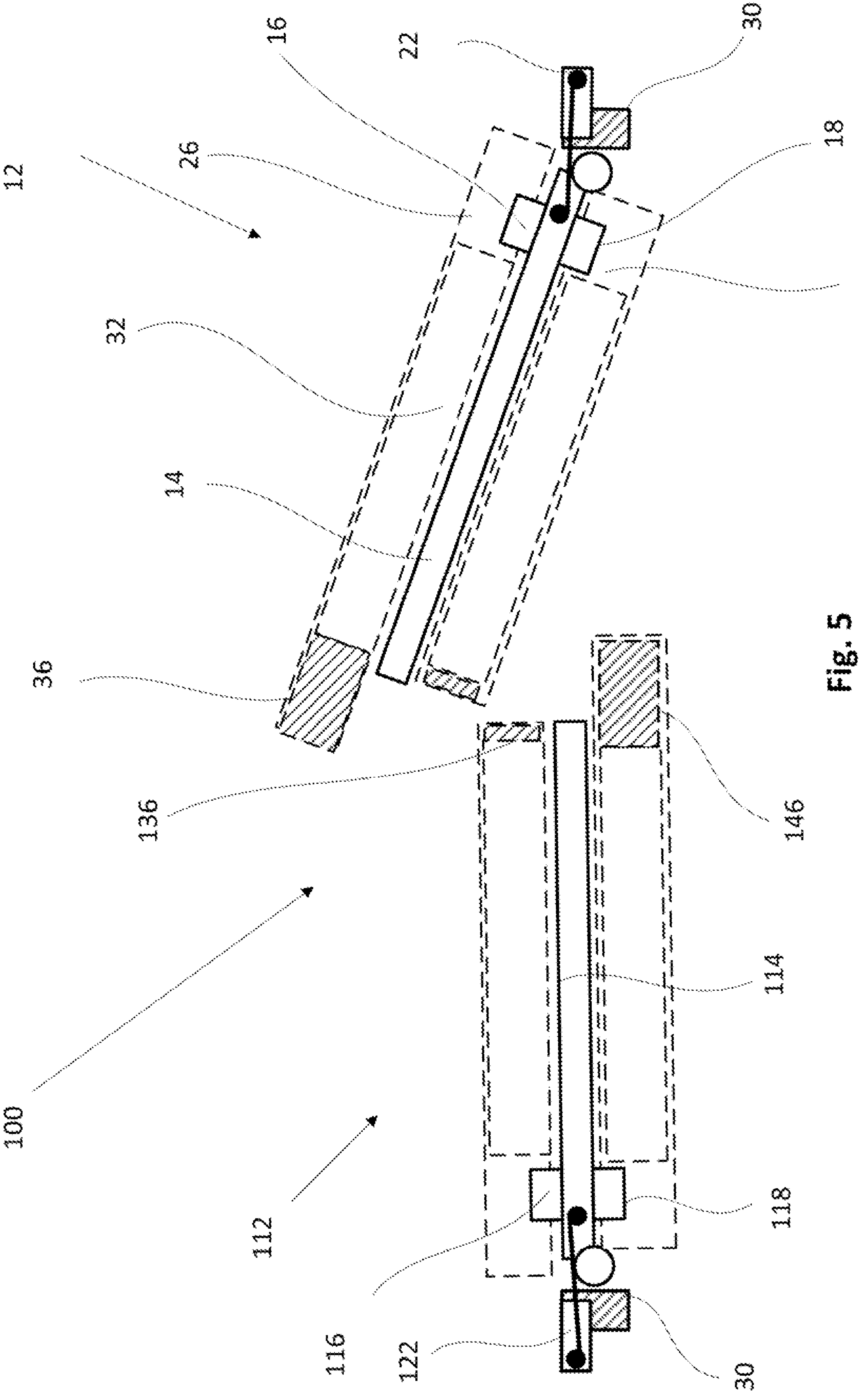
FIG. 5 a schematic top view of an automatic door according to the invention having a first door leaf arrangement and a second door leaf arrangement.

FIG. 5 shows the automatic door 100 of FIG. 4 in a situation during closing, where the second door leaf 114 is fully closed, the first door leaf 14 is almost closed.

The leading face sensor 116 and/or the following face sensor 118 comprise a closed position determination unit that can derive whether the door 100 is fully closed. This closed position determination unit can comprise a connection between the door controllers where the information of the closed position of the door is communicated, or between the sensors on the different door leaves where the position of the door leaves derived from the sensors attached to the same is communicated to the other door leaf.

Once the second door leaf 114 is closed, a detection event in the edge zone 136 activates the opening procedure of the door 100. This behavior is in place until the first door leaf 14 is in a closed position as well. The leading face sensor 116, therefore, comprises a door controller interface that enables the "open" action on the door controller 122.

For this reason the following face sensor 118 comprises a door controller interface that enables the "open" action and the "reopen" action on the door controller 122. In case of discrete wiring between the door controller and the sensor, the sensor comprises preferably three separate output ports.

According to a preferred embodiment of the invention, all sensors 16, 18, 116, 118 comprise the same components, where all sensors have a door controller interface providing three separate output information.

Figure 6:
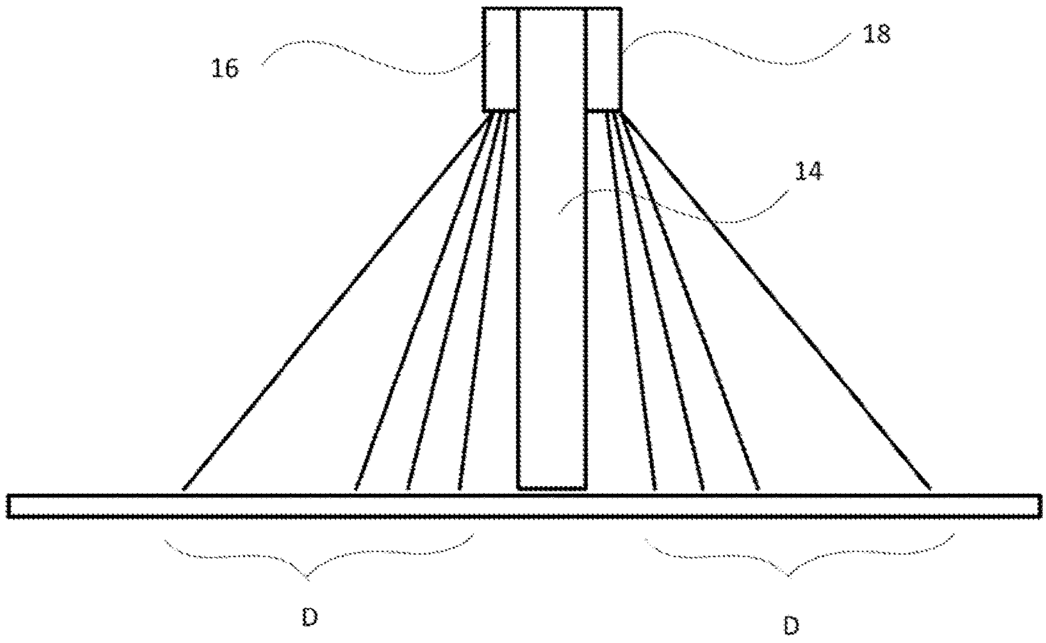
FIG. 6 a side view of a door leaf arrangement of the previous figures.

FIG. 6 shows a side view of a door leaf arrangement of the previous figures. The sensor is embodied as a laser scanner that comprises a rotating mirror with four facets inclined relative to each other to provide four scanning curtains as a scanning beam is deflected by the mirror facets. The scanning field is a three dimensional scanning field, where as a consequence the detection zone accordingly has a depth D perpendicular to the door leaf.

It can further be derived from FIG. 6 that, in case the depth of the scanning zone D at least almost matches the width of the door leaf, the passageway can be fully monitored while the door leaves are in an open position. By monitoring the passageway in the open position a triggering of the closing procedure can be avoided as long as an object is present in the detection zone, especially the leaf zone. This is valid for single leaf door applications as well as for double leaf door applications. Accordingly, the efficiency of the door can be improved, as unnecessary closing movements are prevented.

Figure 7:
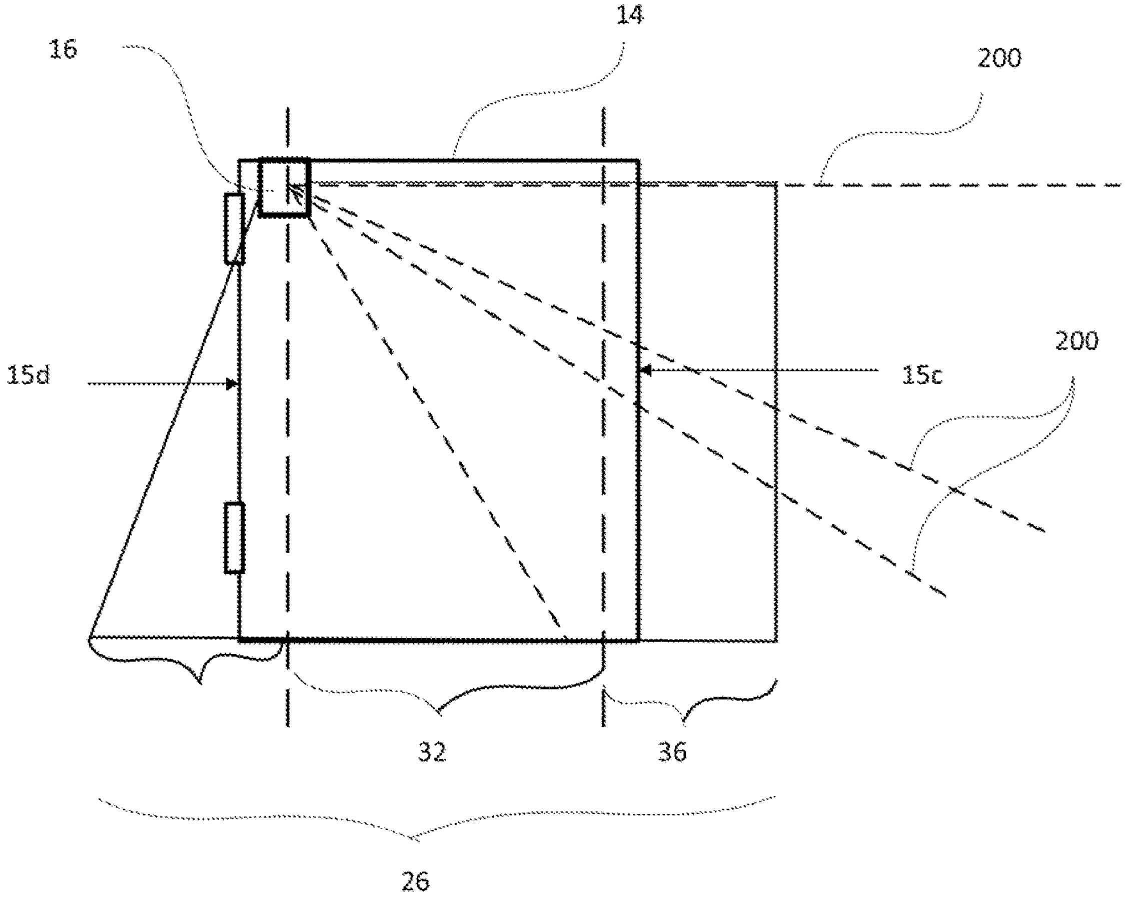
FIG. 7 another side view of a door leaf arrangement of the previous figures.

FIG. 7 shows another side view of a door leaf arrangement 12, where the sensor 16 is mounted on the upper end of the door leaf 14 close to the hinges. The scanning field extends vertically and horizontally. The main part of the scanning field as shown by the beams 200—indicated by the dashed lines—extends in direction of the main closing edge of the door. This side view shows the height extension of the monitored space perpendicular to the detection zone 26.

Figure 8:
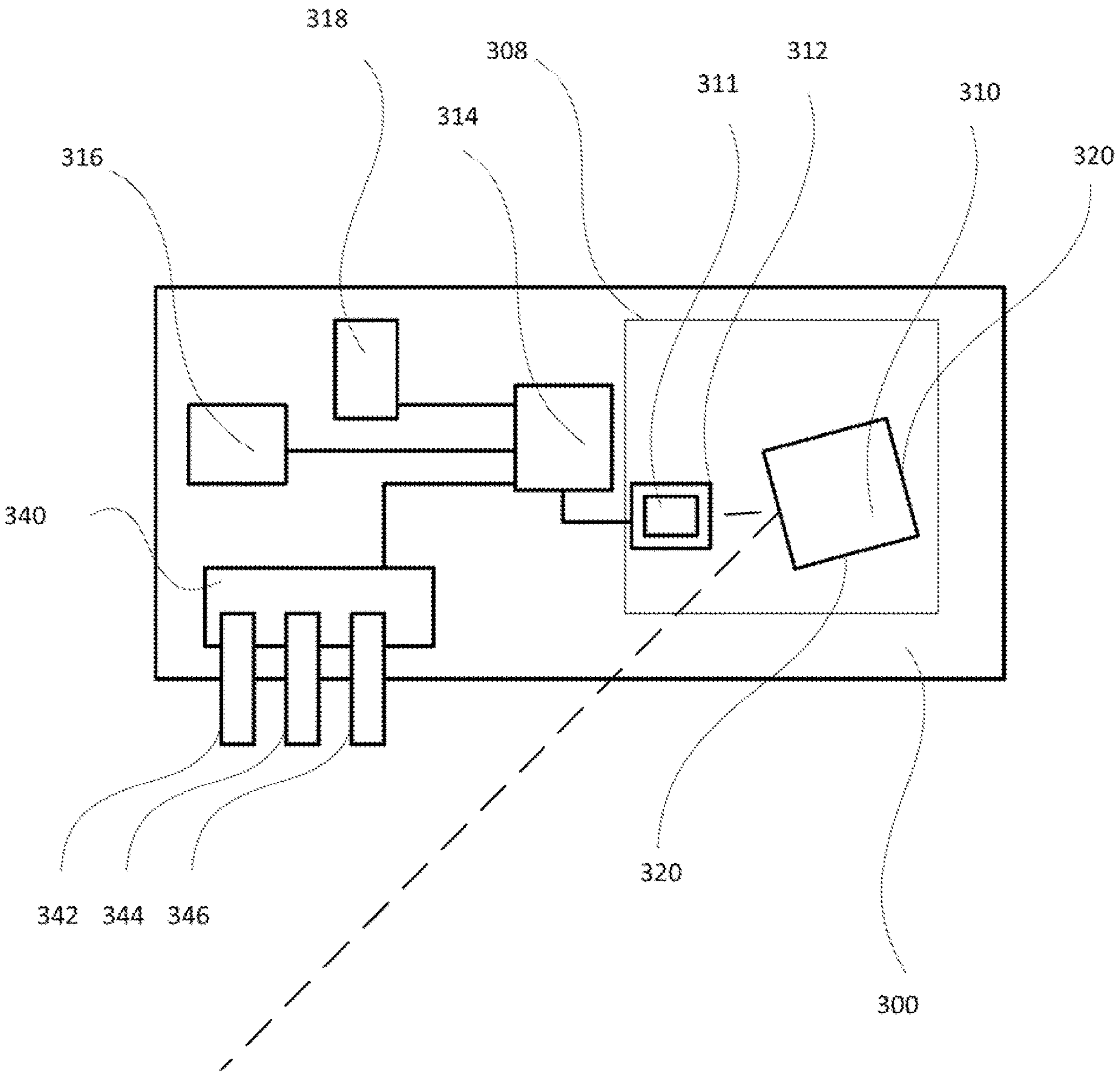
FIG. 8 shows a schematic view of a door sensor according to the invention.

FIG. 8 shows a schematic view of a door sensor 300 according to the invention. The door sensor 300 comprises a scanning unit 308 comprising a rotating mirror 310 that is deflecting emitted and/or echoed laser beams having four differently inclined facets, each for emitting and receiving beams. The beams are emitted by an emitter 311 and the echoed beams are received by a receiver 312. The scanning unit furthermore comprises a detection determination unit 314.

The detection determination unit 314 determines depending on the beam angle and the time of flight of the emitted pulse until the echo is received, the spatial position of an object. The door sensor 300 furthermore comprises a door position and a movement determination unit 316 that can preferably be embodied by comprising a gyroscope. Furthermore, the door sensor 300 comprises a door status determination unit 318 that can derive whether a door is fully closed. This means that all door leaves are supposed to be in a closed position.

The detection determination unit 314 is embodied to set the signal according to the conditions described in the preceding figures depending on the information given to the detection determination unit 314 by the movement determination unit 316 and the door status determination unit 318.

The door sensor 300 comprises a door controller interface 340 that is connected to the detection determination unit 314, where the detection determination unit 314 transfers the requested output information to the door controller interface 340.

According to the invention, the door controller interface 340 comprises at least three output ports 342, 344, 346 that communicate a "reopen" signal via a first output 342, a "stop" signal via a second output 344 and an "open" signal via a third output 346.

LIST OF REFERENCE SIGNS

10 automatic swing door
12 door leaf arrangement
14 door leaf
15*a* leading face
15*b* following face
15*c* main closing edge
15*d* hinged end
16 leading face sensor
18 following face sensor
20 door opening
22 door controller
26 detection zone
28 detection zone
30 door frame
32 leaf zone
36 edge zone
42 leaf zone
46 edge zone
100 automatic swing door
112 door leaf arrangement
114 door leaf
116 leading face sensor
118 following face sensor
122 a door controller
132 leaf zone
142 leaf zone
146 edge zone
300 door sensor
308 scanning unit
311 emitter
310 rotating mirror
312 receiver
314 detection determination unit
316 movement determination unit
318 door status determination unit
320 facet
340 door controller interface
342 output port
344 output port
346 output port

The invention claimed is:

1. Automatic swing door (10, 100), comprising a door controller (22, 122), further comprising a door leaf arrangement (12, 112) that is pivotably attached to a door frame (30), where the door leaf arrangement (12, 112), comprises a door leaf (14, 114) that has a following face (15*b*) that is facing to the door opening (20) and a leading face (15*a*) that is facing away from the door opening (20), a hinged edge (15*d*) and a main closing edge (15*c*) that lies opposite to the hinged edge (15*d*), the door leaf arrangement (12) comprises a leading face sensor (16) that is attached to the leading face (15*a*) of the door leaf (14), where the leading face sensor (16) provides a scanning field that at least covers a zone that lies next to the leading face of the door leaf that lies between the hinged edge and the main closing edge (15*c*) of the door leaf, where a detection zone (26) is defined within the scanning field, where the leading face sensor (16) comprises a movement determination unit (316), to determine the angular movement/position of the door leaf (14), where during an opening operation of the door leaf (14) the detection zone (26) comprises a leaf zone (32) that extends over the most part of the width of the door leaf (14) characterized in that during closing operation of the door, the detection zone (26) comprises an edge zone (36), where the edge zone (36) extends beyond the leaf zone (32) in direction of the main closing edge (15*c*), where a detection of an object in this edge zone (36) triggers the door controller (22) to reopen the door leaf (14) or to open the door.

2. The automatic swing door according to claim 1, characterized in that the door leaf arrangement (12) comprises a following face sensor (18) that is attached on the following face (15*b*) of the door leaf (14).

3. The automatic swing door according to claim 1, characterized in that the edge zone (36) of the detection zone (26) covers an area zone that laterally extends beyond the main closing edge (15*c*) of the door leaf (14).

4. The automatic swing door according to claim 2, characterized in that the detection zone (28) of the following face sensor (18) comprises an edge zone (46) where upon detection of an object in the edge zone (46) the door leaf (14) is reopened and/or the door (10, 100) is opened.

5. The automatic swing door according to claim 1, characterized in that the leading face sensor (16, 116) and/or the following face sensor (18,118) comprises a scanning unit that generates a three dimensional scanning field and a three dimensional detection zone (26, 28, 126, 128).

6. The automatic swing door according to claim 1, characterized in that the scanning unit is a laser scanner that establishes the scanning field by emitting a plurality of laser pulses, evaluating the Time of Flight of the echo.

7. The automatic swing door according to claim 1, characterized in that the automatic swing door (100) comprises a first door leaf arrangement (12) and a second door leaf arrangement (112), where the second door leaf arrangement comprises a leading face sensor (116) and/or a following face sensor (118).

8. The automatic swing door according to claim 7, characterized in that the leading face sensor (116) and/or the following face sensor (118) are configured in a way that in the closed position of the door leaf (112) an open signal is submitted upon detection in the edge zone (136, 146) as long as the first door leaf (12) is not closed.

9. The automatic swing door according to claim 7, characterized in that the first door leaf arrangement (12) and the second door leaf arrangement (112) are operated in an asynchronous way, so that the second door leaf (114) is in a closed position before the first door leaf (14).

10. The automatic swing door according to claim 9, characterized in that leading face sensor (116) and/or the following face sensor (118) comprises a door status determination unit (318) that transmits a "door is open" signal to the detection determination unit (314) when at least one door leaf is not in a closed position and/or a "door is closed" signal when the door is closed.

11. The automatic swing door according to claim 10, characterized in that the edge zone is activated once the door status determination unit (318) transmits a "door is open" signal and/or does not communicate a "door is closed" signal.

12. The automatic swing door according to claim 9, characterized in that the leading face sensor (116) and/or the following face sensor (118) comprises a timer that is started when the movement detection unit determines that the door leaf (112) is in a closed position, to lapse after a predefined timespan, where the edge zone (136, 146) is deactivated when the timer lapses.

13. Sensor (300) comprising a scanning unit (308) producing a scanning field, where the scanning unit (308) comprises a laser scanner (311, 312, 310) that emits light pulses that are evaluated according to the Time of Flight principle, the laser scanner comprises a rotating mirror (310) that has at least two facets that are inclined differently to the rotational axis (R) of the rotating mirror (310), where the light pulses are deflected at the mirror facets (320), where a series of sent pulses on a mirror facet while the mirror is rotating by a predefined angle-facet sweep- and thereby produces a curtain, where the sensor furthermore comprises a door controller interface (340) to provide information in order to trigger different door functions on a door controller, further comprising a detection determination unit (314) that defines a detection zone (26, 28, 126, 128) within the scanning field, where a detection of an object within the detection zone (26, 28, 126, 128) leads to a certain output on the door controller interface (340) to trigger a specific door function, characterized in that the detection determination unit (314) is embodied to execute a first evaluation step, where a first set of measurements of pulses is evaluated, where the first set of measurement contains at least some measurements of the pulses that are accumulated over at least two facet sweeps where the pulse emission is triggered in a way that a plurality of pulses are shifted with regard to the angular mirror position in a way that they have shifted deflection angles, in subsequent facet sweeps, and where the detection determination unit is embodied to execute a second evaluation step, where the second set of measurements is evaluated, where the set of measurements contains measurements of only one facet sweep of the second facet.

14. The sensor according to claim 13, characterized in that the first set of measurements is obtained in a way that the results of the pulses deflected by the first facet, are accumulated over at least two subsequent facet sweeps of the first facet.

15. The sensor according to claim 13, characterized in the mirror (310) comprising a third facet where the third facet comprises essentially the same inclination as the first facet, where the first set of measurement is obtained by accumulating the measurements over the first facet sweep and the third facet sweep.

16. The sensor according to claim 13, characterized in that the sensor comprises a movement determination unit (316) that determines the angular position and the angular moving direction of the sensor.

17. The sensor according to any one of claim 13, characterized in that the detection zone in width direction comprises at least two different subsequent zones of detection, where an edge zone (36, 46, 136, 146) follows a leaf zone (32, 42, 132, 142).

18. The sensor according to claim 17, characterized in that the edge zone (36, 46, 136, 146) is evaluated including the first set of measurements and the leaf zone (32, 42, 132, 142) is evaluated including the second set of measurements.

19. The sensor according to claim 13, characterized in that the inclination of the first facet (320) relative to the rotation axis of the mirror is smaller than the inclination of the second facet (321).

20. The sensor according to claim 13, characterized in that the door controller interface (340) provides three different output information triggering at least three different door functions.

21. The sensor according to claim 13, characterized in that different output information is generated depending on the detection event in a certain zone and the angular position of the door and the moving direction of the door.

22. The sensor according to claim 13, characterized in that the door controller interface (340) comprises three discrete output ports (342, 344, 346) connectable to an input port of a door controller via a wired connection, especially discrete wire connection.

23. The sensor according to claim 13, characterized in that the detection determination unit (314) has a first configuration setup that sets the first output information active on a detection inside the edge zone (36), when the movement determination unit (316) determines a moving direction in closing direction and the second output information to active upon a detection event inside the leaf zone (32), when the movement determination unit (316) determines a moving direction in the opening direction.

24. The sensor according to claim 23, characterized in that the detection determination unit (314) has a second configuration setup that sets the third output information (open) active upon a detection event inside the edge zone (136), when the movement determination unit (316) determines there is no moving direction and the position is a closed position and the first output information is set active while the movement determination unit (316) determines that the moving direction is a closing direction and the second output information to active upon a detection inside the leaf zone (132), when the position evaluation unit determines a moving direction in opening direction.

25. The sensor according to claim 23, characterized in that the detection determination unit (314) has a third configuration setup that sets the first output information active upon a detection inside the edge zone (46) or inside the leaf zone (42), when the movement determination unit (316) determines a moving direction in closing direction.

26. The sensor according to claim 23, characterized in that the detection determination unit (314) has a fourth configuration setup that sets the third output information (open) active upon a detection inside the edge zone (146), when the movement determination unit (316) determines that there is no moving direction and the position is a closed position, and where the first output information is set active upon a detection event inside the edge zone (142) or inside the leaf zone (146), when the movement determination unit (316) determines a moving direction in closing direction.

27. The sensor according to claim 26, characterized in that the sensor comprises a door status determination unit (318) that transmits a "door is open" signal to the detection determination unit (314) when at least one door leaf is in an open position and/or a "door is closed" signal when the door is closed.

28. The sensor according to claim 23, characterized in that the detection determination unit (314) comprises a timer that is started when the movement detection unit (316) determines that the door leaf (112) is in a closed position, to lapse after a predefined timespan, where the edge zone (136, 146) is deactivated when the timer lapses.

29. The sensor according to claim 26, characterized in that the timer is resumed once the door status determination unit (318) communicates a "door is open" signal and/or does not communicate a "door is closed" signal.

30. The sensor according to claim 26, characterized in that the determination unit comprises a configuration setup where the edge zone is activated once the door status determination unit (318) communicates a "door is open" signal and/or does not communicate a "door is closed" signal.

31. The automatic swing door according to claim 1 where the leading face sensor and/or the following face sensor includes a sensor (300) comprising a scanning unit (308) producing a scanning field, where the scanning unit (308) comprises a laser scanner (311, 312, 310) that emits light pulses that are evaluated according to the Time of Flight principle, the laser scanner comprises a rotating mirror (310) that has at least two facets that are inclined differently to the rotational axis (R) of the rotating mirror (310), where the light pulses are deflected at the mirror facets (320), where a series of sent pulses on a mirror facet while the mirror is rotating by a predefined angle-facet sweep- and thereby produces a curtain, where the sensor furthermore comprises a door controller interface (340) to provide information in order to trigger different door functions on a door controller, further comprising a detection determination unit (314) that defines a detection zone (26, 28, 126, 128) within the scanning field, where a detection of an object within the detection zone (26, 28, 126, 128) leads to a certain output on the door controller interface (340) to trigger a specific door function, characterized in that the detection determination unit (314) is embodied to execute a first evaluation step, where a first set of measurements of pulses is evaluated, where the first set of measurement contains at least some measurements of the pulses that are accumulated over at least two facet sweeps where the pulse emission is triggered in a way that a plurality of pulses are shifted with regard to the angular mirror position in a way that they have shifted deflection angles, in subsequent facet sweeps, and where the detection determination unit is embodied to execute a second evaluation step, where the second set of measurements is evaluated, where the set of measurements contains measurements of only one facet sweep of the second facet.

* * * * *